(12) United States Patent
Konishi

(10) Patent No.: US 10,668,820 B2
(45) Date of Patent: Jun. 2, 2020

(54) PROTOCOL CONVERSION APPARATUS FOR ELECTRIC VEHICLE

(71) Applicant: Mitsubishi Electric Corporation, Tokyo (JP)

(72) Inventor: Takao Konishi, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 66 days.

(21) Appl. No.: 16/062,035

(22) PCT Filed: Feb. 15, 2016

(86) PCT No.: PCT/JP2016/054333
§ 371 (c)(1),
(2) Date: Jun. 13, 2018

(87) PCT Pub. No.: WO2017/141329
PCT Pub. Date: Aug. 24, 2017

(65) Prior Publication Data
US 2018/0370378 A1  Dec. 27, 2018

(51) Int. Cl.
*B60L 53/18* (2019.01)
*B60L 50/50* (2019.01)
(Continued)

(52) U.S. Cl.
CPC ......... *B60L 11/1838* (2013.01); *B60L 3/0046* (2013.01); *B60L 50/50* (2019.02);
(Continued)

(58) Field of Classification Search
CPC ..................... B60L 53/14–18; B60L 53/305
(Continued)

(56) References Cited

U.S. PATENT DOCUMENTS

| 2014/0266042 | A1  | 9/2014 | Storm |
| 2016/0036256 | A1* | 2/2016 | Sukup .................. H02J 7/0052 320/107 |
| 2016/0052411 | A1* | 2/2016 | Tanabe .................. B60L 3/0023 320/109 |

FOREIGN PATENT DOCUMENTS

| JP | 2014-124033 A | 7/2014 |
| JP | 2014-183739 A | 9/2014 |
| WO | WO 2014/163618 A1 | 10/2014 |

\* cited by examiner

*Primary Examiner* — David V Henze-Gongola
(74) *Attorney, Agent, or Firm* — Birch, Stewart, Kolasch & Birch, LLP.

(57) ABSTRACT

A protocol conversion apparatus includes: a first communication unit that communicates with a power conditioner that supports a first charging protocol; a second communication unit that communicates with an electric vehicle that supports a second charging protocol; and a control unit that is a conversion unit placed between the first communication unit and the second communication unit, which receives from the first communication unit a communication signal received from the power conditioner, and upon the reception, converts the received signal to a communication signal that conforms to the second charging protocol to output the resultant signal to the second communication unit, and which receives from the second communication unit a communication signal received from the electric vehicle, and upon the reception, converts the received signal to a communication signal that conforms to the first charging protocol to output the resultant signal to the first communication unit.

6 Claims, 8 Drawing Sheets

(51) Int. Cl.
*B60L 53/60* (2019.01)
*B60L 53/14* (2019.01)
*B60L 3/00* (2019.01)
*H02J 7/00* (2006.01)
*B60L 11/18* (2006.01)
*B60L 53/30* (2019.01)

(52) U.S. Cl.
CPC ............ *B60L 53/14* (2019.02); *B60L 53/305* (2019.02); *B60L 53/60* (2019.02); *H02J 7/0027* (2013.01); *H02J 7/00034* (2020.01); *H02J 7/00045* (2020.01); *Y02T 10/7005* (2013.01); *Y02T 90/16* (2013.01)

(58) Field of Classification Search
USPC ........................................................ 320/109
See application file for complete search history.

PROTOCOL CONVERSION APPARATUS FOR ELECTRIC VEHICLE

FIELD

The present invention relates to a protocol conversion apparatus intended to enable a charging apparatus that charges a battery mounted in an electric vehicle to charge a battery mounted in an electric vehicle that supports a charging protocol different from that supported by the charging apparatus.

BACKGROUND

A power conditioner that can convert electric power from AC power to DC power and from DC power to AC power may be used as a charging apparatus for charging a storage battery (a driving battery) that stores electric power to be supplied to an electric motor in an electric vehicle. The power conditioner converts AC power that is supplied from an electrical grid power supply of a commercial system or the like to DC power when charging the driving battery and converts the DC power discharged by the driving battery to AC power when electric power stored in the driving battery is used by an appliance or the like in a house.

When a driving battery mounted in an electric vehicle is charged, a charging apparatus such as a power conditioner communicates with the electric vehicle in some cases, and this communication is performed in accordance with a charging protocol. Existing charging protocols are based on multiple schemes including CHAdeMO scheme (CHAdeMO protocol) used mainly in Japan and SAE J1772 scheme (hereinafter referred to as COMBO protocol) used in the United States and Europe.

A system that can charge different types of electric vehicles using different charging protocols is disclosed in Patent Literature 1. A charging unit included in a quick charging system for an electric vehicle described in Patent Literature 1 includes a cable that supports the CHAdeMO protocol and a cable that supports the COMBO protocol. When subjecting an electric vehicle to charging using the quick charging system, a user connects a cable of the protocol supported by the electric vehicle to be subjected to the charging to the electric vehicle and operates a selection switch provided in the charging unit to select a charging protocol to be used.

CITATION LIST

Patent Literature

Patent Literature 1: Japanese Patent Application Laid-open No. 2014-183739

SUMMARY

Technical Problem

The invention described in Patent Literature 1 includes the selection switch for selecting a charging protocol to be used, and a user needs to operate the selection switch to select an appropriate charging protocol in order to charge the electric vehicle. The invention described in Patent Literature 1 also includes two or more charging cables, that is, cables supporting their respective charging protocols, and a user needs to select a charging cable that supports the charging protocol used by the electric vehicle. As described above, the invention described in Patent Literature 1 has been problematic in that the system has a complex configuration and the operation for charging is complicated.

The present invention has been achieved in view of the above circumstances, and an object of the present invention is to provide a protocol conversion apparatus that achieves a charging system that can support a plurality of charging protocols with a simple configuration and simplifies an operation performed by a user.

Solution to Problem

To solve the problems described above and achieve the object, a protocol conversion apparatus according to the present invention has a first communication unit to communicate with a charging apparatus that supports a first charging protocol, and a second communication unit to communicate with an electric vehicle that supports a second charging protocol. The protocol conversion apparatus further has a conversion unit provided between the first communication unit and the second communication unit, to, when receiving from the first communication unit a communication signal received from the charging apparatus, convert the received signal to a communication signal that conforms to the second charging protocol to output the resultant signal to the second communication unit, and to, when receiving from the second communication unit a communication signal received from the electric vehicle, convert the received signal to a communication signal that conforms to the first charging protocol to output the resultant signal to the first communication unit.

Advantageous Effects of Invention

The protocol conversion apparatus according to the present invention has an advantageous effect of achieving a charging system that can support a number of charging protocols with a simple configuration and simplify a user's operation.

DESCRIPTION OF EMBODIMENTS

Protocol conversion apparatuses according to embodiments of the present invention are described below in detail with reference to the drawings. The present invention is not necessarily limited by these embodiments.

First Embodiment

Firstly, description is given for an electric-vehicle charging system before a protocol conversion apparatus according to the present invention is applied thereto.

Figure 1:
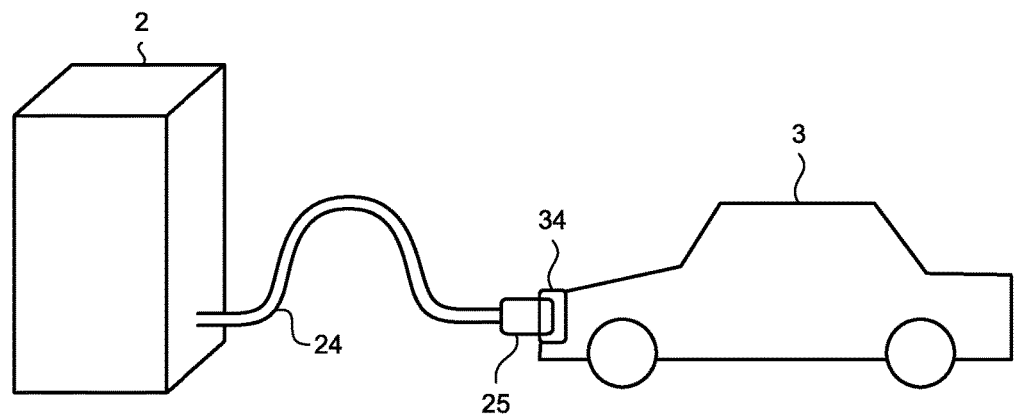
FIG. 1 is a sketch illustrating a usage pattern of an electric-vehicle charging system before a protocol conversion apparatus according to the present invention is applied thereto.

FIG. 1 is a sketch illustrating a usage pattern of an electric-vehicle charging system before the protocol conversion apparatus according to the present invention is applied thereto. The electric-vehicle charging system before the protocol conversion apparatus according to the present invention is applied thereto includes a power conditioner 2 for an electric vehicle, and the power conditioner 2 is connected with a charging/discharging cable 24. A charging/discharging cable connector 25 is provided to an end of the charging/discharging cable 24. The charging/discharging cable connector 25 is connected to a charging/discharging cable receptacle 34 of an electric vehicle 3. Charge or discharge for a driving battery mounted in the electric vehicle 3 is performed by an operation of the power conditioner 2 to convert electric power with the charging/discharging cable connector 25 being connected to the charging/discharging cable receptacle 34 of the electric vehicle 3. The power conditioner 2 converts AC power supplied from an electrical grid to DC power to charge the driving battery, but converts the DC power discharged from the driving battery to the AC power to discharge the driving battery.

Figure 2:
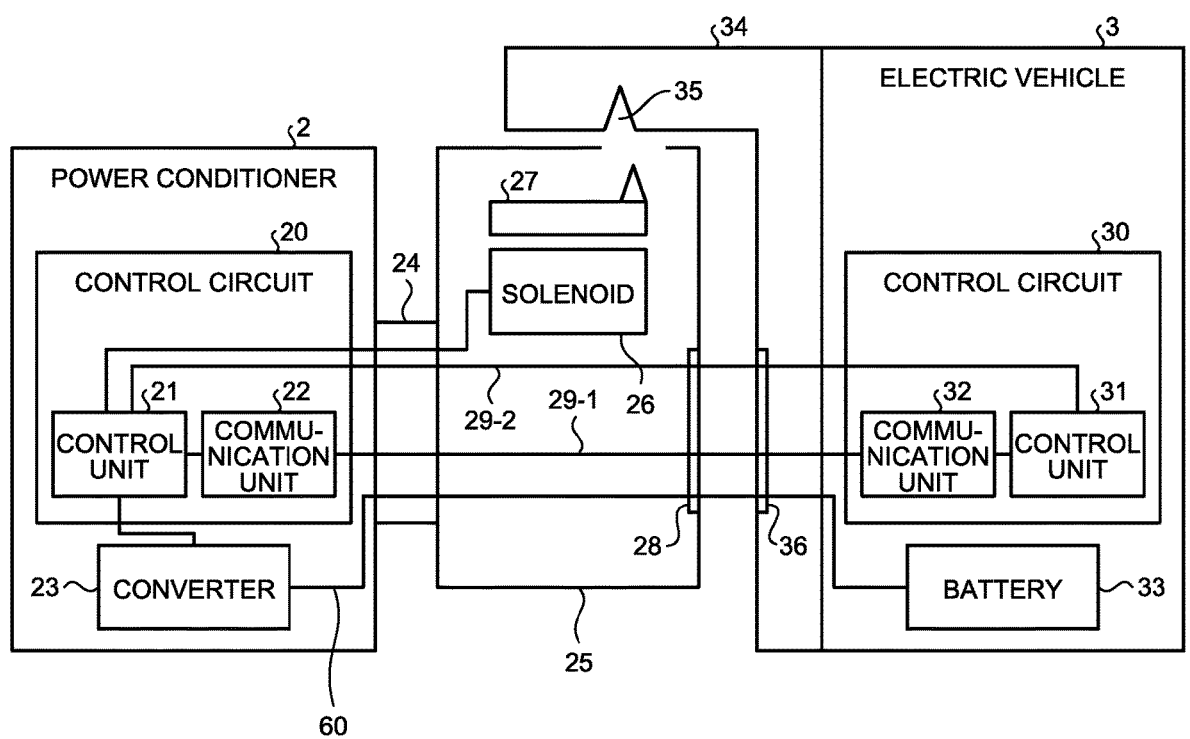
FIG. 2 is a diagram illustrating an example inner configuration of the electric-vehicle charging system illustrated in FIG. 1.

FIG. 2 is a diagram illustrating an example inner configuration of the electric-vehicle charging system illustrated in FIG. 1. In the electric-vehicle charging system illustrated in FIG. 2, the power conditioner 2 includes in its inside a control circuit 20 and a converter 23. The charging/discharging cable connector 25, which is connected to the power conditioner 2 via the charging/discharging cable 24, includes a solenoid 26, a lever 27, and a connection unit 28. The charging/discharging cable connector 25 is connected to the charging/discharging cable receptacle 34 situated on an electric vehicle 3 side. The electric vehicle 3 includes a control circuit 30 and a battery 33 that is the driving battery. The power conditioner 2 and the electric vehicle 3 are electrically connected to each other by the connection unit 28 and a connection unit 36, which are connectors. The control circuit 20 in the power conditioner 2 and the control circuit 30 in the electric vehicle 3 are connected to each other via a communication line 29-1 and a control line 29-2. The converter 23 in the power conditioner 2 and the battery 33 in the electric vehicle 3 are connected to each other via an electric-power supply line 60.

The control circuit 20 in the power conditioner 2 is intended to transmit and receive a control signal and a communication signal with the control circuit 30 in the electric vehicle 3, and includes a control unit 21 and a communication unit 22. The control circuit 30 in the electric vehicle 3 includes a control unit 31 and a communication unit 32. The communication unit 22 in the control circuit 20 and the communication unit 32 in the control circuit 30 can be each implemented by a driver integrated circuit (IC) for communication. The power conditioner 2 locks the connection between the charging/discharging cable connector 25 and the charging/discharging cable receptacle 34 by the control circuit 20 enabling an electric current to pass through the solenoid 26 to move the lever 27 so that the lever 27 is inserted into a cutout portion 35 of the charging/discharging cable receptacle 34.

Figure 3:
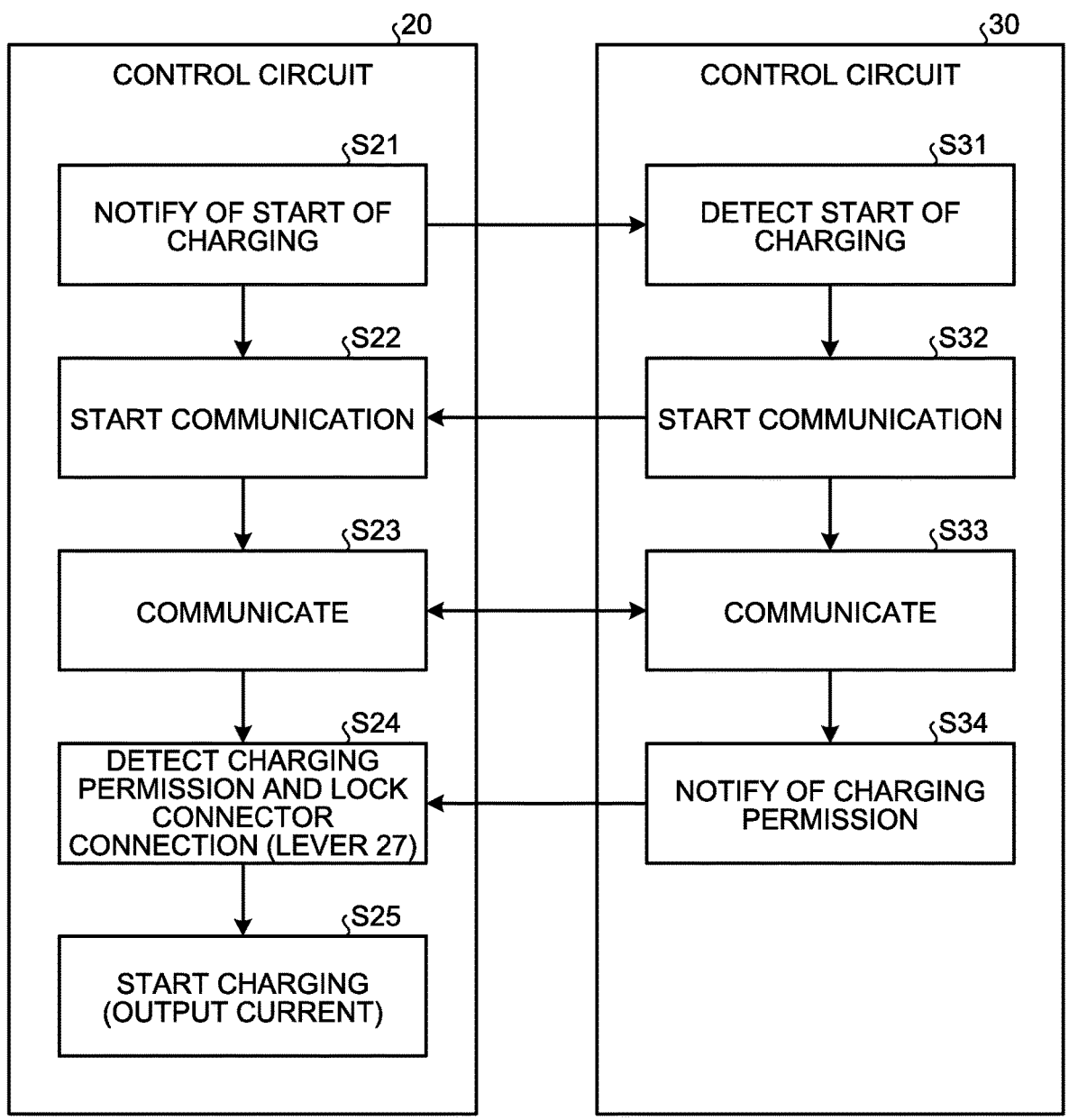
FIG. 3 is a diagram illustrating an example charging sequence in the electric-vehicle charging system before the protocol conversion apparatus according to the present invention is applied thereto.

FIG. 3 is a diagram illustrating an example charging sequence in the electric-vehicle charging system before the protocol conversion apparatus according to the present invention is applied thereto. FIG. 3 illustrates a sequence of communication performed by the control circuit 20 in the power conditioner 2 and the control circuit 30 in the electric vehicle 3 before start of charging the battery 33 in the electric vehicle 3. The power conditioner 2 and the electric vehicle 3 are supposed to support the same charging sequence.

When charging is to be started, the control circuit 20 in the power conditioner 2 notifies the control circuit 30 in the electric vehicle 3 of the start of charging from the control unit 21 via the control line 29-2 (step S21). When the control circuit 30 in the electric vehicle 3 detects reception of the notification of the start of charging from the control circuit 20 (step S31), the control circuit 30 and the control circuit 20 start communication via the communication line 29-1 (steps S32 and S22). At this time, a communication signal transmitted from the control circuit 30 to the control circuit 20 is transmitted to the control unit 21 via the communication unit 22 of the control circuit 20 in the power conditioner 2. After the communication is started (steps S23 and S33), the control circuit 30 in the electric vehicle 3 notifies the control circuit 20 in the power conditioner 2 of charging permission via the communication line 29-1 (step S34). This notification reaches the control unit 21 via the communication unit 22 in the control circuit 20, the control unit 21 in the control circuit 20 having received the notification enables a current to pass through the solenoid 26 inside the charging/discharging cable connector 25 to move the lever 27 so that the lever 27 is inserted in the cutout portion 35 situated inside the charging/discharging cable receptacle 34 of the electric vehicle 3, thereby locking the connection between the charging/discharging cable connector 25 and the charging/discharging cable receptacle 34 (step S24). This assures making connection between the power conditioner 2 and the electric vehicle 3. When the connection is locked, the converter 23 in the power conditioner 2 outputs a direct current for charging to the battery 33 of the electric vehicle 3 with the start of charging (step S25).

The charging sequence illustrated in FIG. 3 is a sequence used when the CHAdeMO scheme is used. FIG. 3 is intended to only show a part pertaining to the invention without showing control contents and communication contents not directly pertaining to the invention. Although the above example illustrates a case where the converter 23 in the power conditioner 2 charges the battery 33 in the electric vehicle 3, the similar way applies to a sequence for a case where the battery 33 in the electric vehicle 3 is discharged to the converter 23 in the power conditioner 2. In the case of the CHAdeMO scheme, a controller area network (CAN) communication is used for communication between the control circuits.

Figure 4:
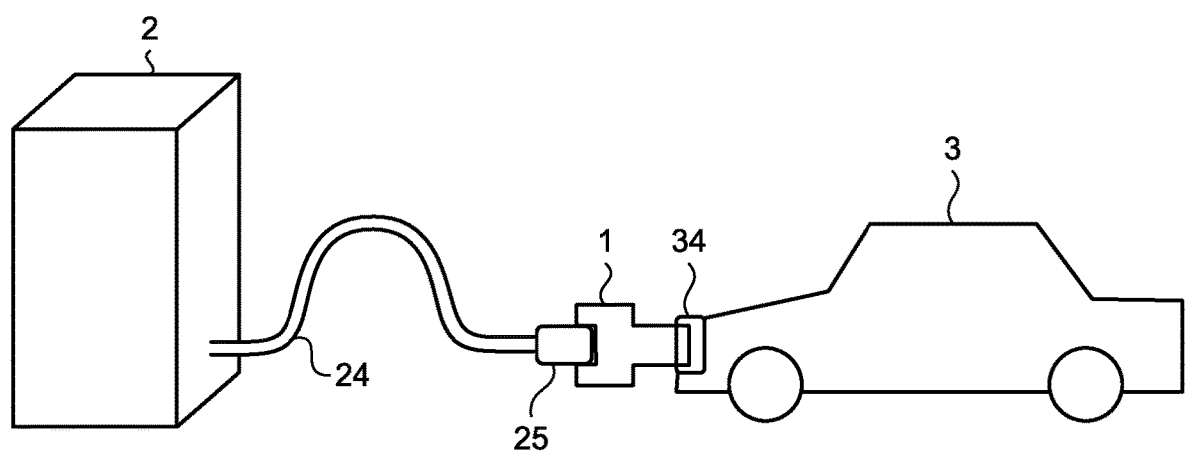
FIG. 4 is a sketch illustrating a usage pattern of an electric-vehicle charging system in a case where a protocol conversion apparatus according to a first embodiment is applied thereto.

FIG. 4 is a sketch illustrating a usage pattern of an electric-vehicle charging system when a protocol conversion apparatus according to a first, embodiment is applied thereto. A protocol conversion apparatus 1 according to the present invention is used between the charging/discharging cable connector 25 on a side of the power conditioner 2 and the charging/discharging cable receptacle 34 on a side of the electric vehicle 3, both of which are illustrated in FIGS. 1 and 2. The power conditioner 2, the charging/discharging cable 24, the charging/discharging cable connector 25, the electric vehicle 3, and the charging/discharging cable receptacle 34 are identical with those designated with the same reference symbols in FIGS. 1 and 2, except the protocol conversion apparatus 1.

Figure 5:
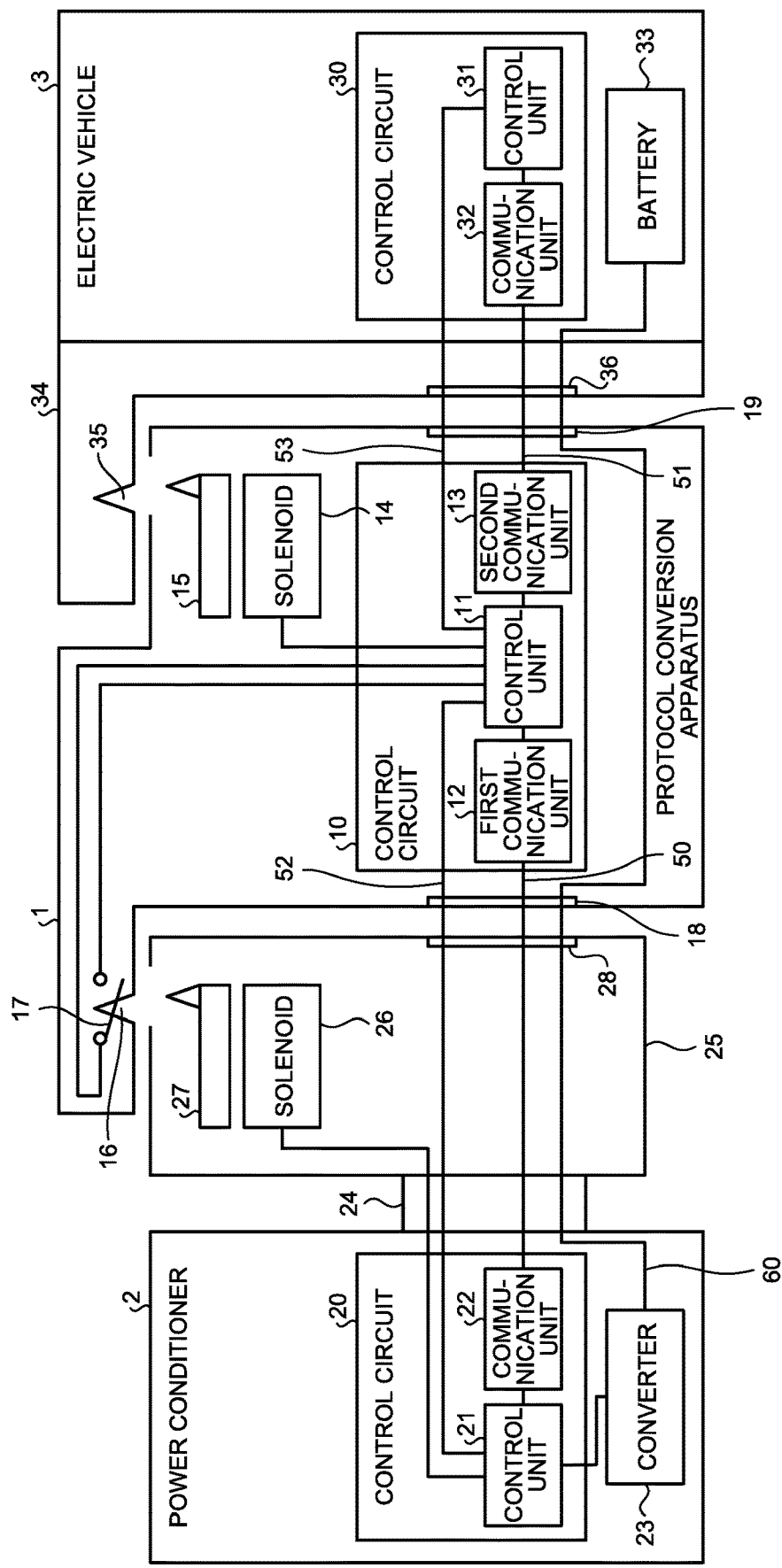
FIG. 5 is a diagram illustrating an exemplary inner configuration of the electric-vehicle charging system according to the first embodiment.

FIG. 5 is a diagram illustrating an exemplary inner configuration of the electric-vehicle charging system according to the first embodiment. The protocol conversion apparatus 1 is described here with omitting the description of the inner configurations of the power conditioner 2, the electric vehicle 3, and the like, which have been already explained.

The protocol conversion apparatus 1 according to the first embodiment includes a control circuit 10, a solenoid 14, a lever 15, a switch 17, and connection units 18 and 19. The control circuit 10 relays a communication signal (control information and data) between the power conditioner 2 and the electric vehicle 3 and controls the solenoid 14. The control circuit 10 includes a control unit 11, and when relaying a received communication signal, the control unit 11 converts the received communication signal into a communication signal in a format that conforms to a charging protocol supported by a destination apparatus to which the signal is relayed (the power conditioner or the electric vehicle). The control unit 11 operates as a conversion unit.

The control unit 21 in the power conditioner 2 and the control unit 11 in the protocol conversion apparatus 1 are connected to each other by a control line 52, and the control circuit 30 in the electric vehicle 3 and the control unit 11 in the protocol conversion apparatus 1 are connected to each other by a control line 53. The control circuit 10 includes a first communication unit 12 for communicating with the control unit 21 in accordance with a charging protocol and a second communication unit 13 for communicating with the control unit 31 in accordance with a charging protocol. The first communication unit 12 is connected to the communication unit 22 in the power conditioner 2 via a communication line 50, and the second communication unit 13 is connected to the communication unit 32 in the electric vehicle 3 via a communication line 51. The control unit 11 and the control unit 21 use the control line 52 in a case of transmitting and receiving control information or the like not in compliance with a charging protocol, such as a case of notifying start of communication in compliance with a charging protocol. Similarly, the control unit 11 and the control unit 31 use the control line 53 in a case of transmitting and receiving control information or the like not in compliance with a charging protocol.

The first communication unit 12 and the second communication unit 13 can be each implemented using a driver IC for communication. The first communication unit 12 transmits a communication signal having a format that conforms to a charging protocol employed by the power conditioner 2, to the communication unit 22 of the power conditioner 2 and receives the communication signal from the unit 32. The second communication unit 13 transmits a communication signal having a format that conforms to a charging protocol employed by the electric vehicle 3, to the communication unit 32 in the electric vehicle 3 and receives the communication signal from the unit 32. A first charging protocol that is the charging protocol supported by the power conditioner 2 is different from a second charging protocol that is the charging protocol supported by the electric vehicle 3.

The protocol conversion apparatus 1 and the power conditioner 2 are electrically connected to each other by the connection unit 18 and the connection unit 28, which are connectors. The protocol conversion apparatus 1 and the electric vehicle 3 are electrically connected to each other by the connection unit 19 and the connection unit 36, which are connectors. The control circuit 10 in the protocol conversion apparatus 1 and the control circuit 20 in the power conditioner 2 are connected to each other via the communication line 50 and the control line 52. The control circuit 10 in the protocol conversion apparatus 1 and the control circuit 30 in the electric vehicle 3 are connected to each other via the communication line 51 and the control line 53. The converter 23 in the power conditioner 2 and the battery 33 in the electric vehicle 3 are connected to each other via an electric-power supply line 60.

Figure 6:
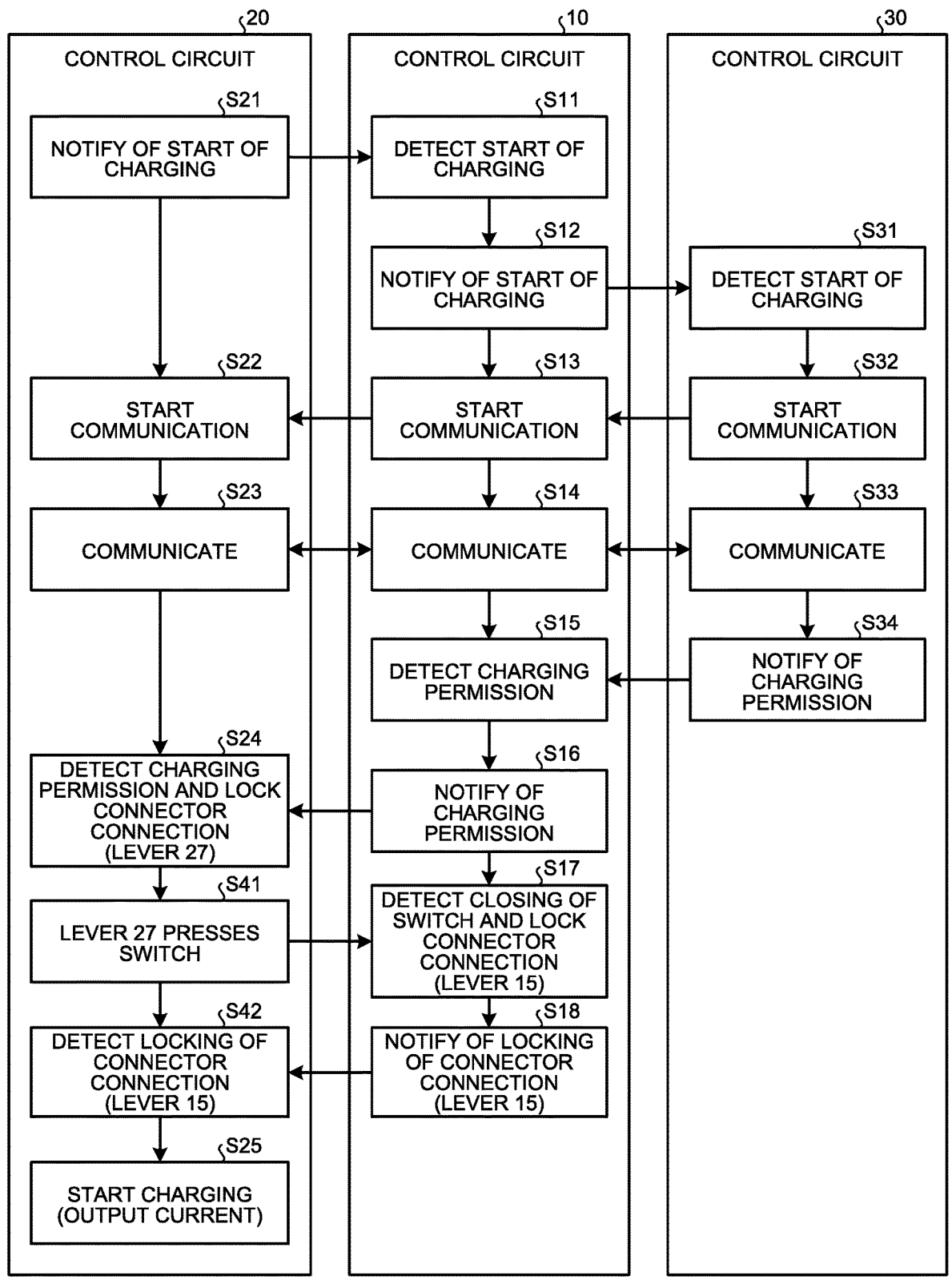
FIG. 6 is a diagram illustrating an exemplary charging sequence in the electric-vehicle charging system according to the first embodiment.

FIG. 6 is a diagram illustrating an exemplary charging sequence in the electric-vehicle charging system to which the protocol conversion apparatus according to the first embodiment is applied. FIG. 6 illustrates a sequence in which the control circuit 10 in the protocol conversion apparatus 1 relays communication performed by the control circuit 20 in the power conditioner 2 and the control circuit 30 in the electric vehicle 3 before start of charging the battery 33 in the electric vehicle 3. Processing in steps S21 to S25 and S31 to S34 illustrated in FIG. 6 is similar to the processing in steps S21 to 25 and S31 to S34 illustrated in FIG. 3.

When charging is to be started, a user inserts the charging/discharging cable connector 25 into the protocol conversion apparatus 1 firstly, and then inserts the protocol conversion apparatus 1 into the charging/discharging cable receptacle 34 of the electric vehicle 3, so as to mechanically connect them. After the mechanical connection is completed, the control circuit 20 in the power conditioner 2 notifies the control unit 11 of the control circuit 10 in the protocol conversion apparatus 1 of the start of charging from the control unit 21 via the control line 52 (step S21), and the control unit 11 of the control circuit 10 detects the start of charging (step S11). The control unit 11 of the control circuit 10 then notifies the control unit 31 of the control circuit 30 in the electric vehicle 3 of the start of charging via the control line 53 (step S12), and the control unit 31 of the control circuit 30 detects the start of charging (step S31).

The control circuit 30 in the electric vehicle 3, which has notified of the start of charging, notifies the control circuit 20 in the power conditioner 2 of start of communication via the control circuit 10 in the protocol conversion apparatus 1 (steps S32, S13, and S22), and the control circuit 20 in the power conditioner 2 and the control circuit 30 in the electric vehicle 3 start communication via the control circuit 10 in the protocol conversion apparatus 1 (steps S23, S14, and S33).

Here, the second communication unit 13 and the communication unit 32 are involved in communication between the control unit 11 of the control circuit 10 in the protocol conversion apparatus 1 and the control unit 31 of the control circuit 30 in the electric vehicle 3. Additionally, the first communication unit 12 and the communication unit 22 are involved in communication between the control unit 11 of the control circuit 10 and the control unit 21 of the control circuit 20 in the power conditioner 2.

The control circuit 10 of the protocol conversion apparatus 1 is configured to have the first communication unit 12 between the control unit 11 and the control circuit 20 in the power conditioner 2 and have the second communication unit 13 between the control unit 11 and the control circuit 30 in the electric vehicle 3 because the CHAdeMO protocol and the COMBO protocol have their respective designated different communication schemes. Since the protocol conversion apparatus 1 includes the first communication unit 12 and the second communication unit 13, the protocol conversion apparatus 1 can make both of communication in a communication scheme designated by the CHAdeMO protocol and communication in another communication scheme designated by the COMBO protocol. The first communication unit 12 perform communication using a communication scheme designated by the CHAdeMO protocol or another communication scheme designated by the COMBO protocol, whereas the second communication unit 13 performs communication using a communication scheme different from that of the first communication unit 12. For example, in the case where the power conditioner 2 supports the CHAdeMO protocol and the electric vehicle 3 supports the COMBO protocol, communication between the protocol conversion apparatus 1 and the power conditioner 2 is CAN communication, and communication between the protocol conversion apparatus 1 and the electric vehicle 3 is power line communication (PLC) communication. In this case, the first communication unit 12 is implemented using a driver IC that supports the CAN communication and the second communication unit 13 is implemented using a driver IC that supports the PLC communication.

The control unit 11 of the control circuit 10 in the protocol conversion apparatus 1 converts a communication signal that conforms to a communication scheme supported by the first communication unit 12 to a communication signal that conforms to a communication scheme supported by the second communication unit 13, and vice versa. Specifically, when the control unit 11 receives a communication signal that conforms to the CAN communication, the control unit 11 converts the signal to a communication signal that conforms to the PLC communication, and when the control unit 11 receives a communication signal that conforms to the PLC communication, the control unit 11 converts the signal to a communication signal that conforms to the CAN communication.

With reference back to FIG. 6, the control circuit 30 in the electric vehicle 3, when the communication is started, notifies the control circuit 10 in the protocol conversion apparatus 1 of charging permission (step S34), and the control circuit 10 detects the charging permission (step S15). The control circuit 10 having detected the charging permission notifies the control circuit 20 in the power conditioner 2 of the charging permission (step S16). The control circuit 20 in the power conditioner 2, when detecting the charging permission, enables a current to pass through the solenoid 26 in the charging/discharging cable connector 25 to move the lever 27 so that the lever 27 is inserted into a cutout portion 16 of the protocol conversion apparatus 1, thereby locking the connection between the charging/discharging cable connector 25 and the protocol conversion apparatus 1 (step S24). When the lever 27 of the charging/discharging cable connector 25 is inserted in the cutout portion 16 of the protocol conversion apparatus 1, the lever 27 presses the switch 17 of the protocol conversion apparatus 1, thereby closing the switch 17 (step S41). The control circuit 10 in the protocol conversion apparatus 1, when detecting the closing of the switch 17, enables a current to pass through the solenoid 14 to move the lever 15 so that the lever 15 is inserted into the cutout portion 35 of the charging/discharging cable receptacle 34, thereby locking the connection between the protocol conversion apparatus 1 and the charging/discharging cable receptacle 34 (step S17). The switch 17 is a locking-state detection unit that detects a state in which the connection between the protocol conversion apparatus 1 and the power conditioner 2 is locked. The solenoid 14 and the lever 15 serve as a connection locking unit that locks the connection with the electric vehicle 3 when the state in which the connection between the protocol conversion apparatus 1 and the power conditioner 2 is locked is detected.

When the connection between the protocol conversion apparatus 1 and the charging/discharging cable receptacle 34 is locked, the control circuit 10 in the protocol conversion apparatus 1 notifies the control circuit 20 in the power conditioner 2 of the locking of the connection (step S18), and the control circuit 20 detects the locking of the connection between the protocol conversion apparatus 1 and the electric vehicle 3 (step S42). In this state, the power conditioner 2 and the protocol conversion apparatus 1 are reliably connected and the protocol conversion apparatus 1 and the electric vehicle 3 are reliably connected, so that the converter 23 in the power conditioner 2 can charge the battery 33 in the electric vehicle 3. Then, the control unit 21 of the control circuit 20 instructs the converter 23 to start charging to enable the converter 23 to start outputting a charging current (step S25).

As described above, the control unit 11 in the protocol conversion apparatus 1 firstly detects locking of the connection between the power conditioner 2 and the protocol conversion apparatus 1 through the switch 17 and, then, locks the connection between the charging/discharging cable receptacle 34 of the electric vehicle 3 and the protocol conversion apparatus 1, thus ensuring the connection of the protocol conversion apparatus 1 with the power conditioner 2, thereby making it possible to perform safe charging without disconnection thereof during the charging.

As described above, the protocol conversion apparatus 1 according to the present embodiment has a construction with placement of the apparatus 1 between the power conditioner 2 and the electric vehicle 3 to be connectable to both of the power conditioner 2 and the electric vehicle 3. When a charging protocol of the power conditioner is different from that of the electric vehicle, the protocol conversion apparatus 1 is connected to the power conditioner 2 and the electric vehicle 3, and the protocol conversion apparatus 1 converts a communication signal received from the power conditioner 2 to a communication signal that conforms to a charging protocol of the electric vehicle 3 and transmits the resultant signal to the electric vehicle 3, and converts a communication signal received from the electric vehicle 3 to a communication signal that conforms to a charging protocol of the power conditioner 2 and transmits the resultant signal to the power conditioner 2. For example, in the case where the power conditioner 2 supports a charging protocol of the CHAdeMO scheme and the electric vehicle supports a charging protocol of the COMBO scheme, a communication signal transmitted and received by the power conditioner 2 is a signal that conforms the CHAdeMO protocol. The power conditioner 2 does not operate even when the conditioner is directly connected as is to the electric vehicle 3 supporting the COMBO protocol. Therefore, the control circuit 10 in the protocol conversion apparatus 1 recognizes a communication signal and a communication procedure of the CHAdeMO protocol, replaces the communication signal received from the power conditioner 2 with a communication signal of the COMBO protocol, and transmits the resultant signal to the electric vehicle 3. Similarly even in the case of reverse communication, that is, communication from the electric vehicle 3 to the power conditioner 2, the control circuit 10 recognizes a communication signal and a communication procedure of the COMBO protocol, replaces the communication signal received from the electric vehicle 3 with a communication signal of the CHAdeMO protocol, and transmits the resultant signal to the power conditioner 2. By virtue of the operation of the protocol conversion apparatus 1, it is possible to establish the communication between the power conditioner 2 supporting the CHAdeMO protocol and the electric vehicle 3 supporting the COMBO protocol, thus enabling the battery 33, which is the driving battery of the electric vehicle 3, to be charged and discharged.

The protocol conversion apparatus 1 according to the present embodiment eliminates the need to provide charging cables that support their respective charging protocols and eliminates the need to provide a switch or the like for selecting a charging protocol to be used, thus achieving a charging system that can support a plurality of charging protocols, with a simple configuration. Additionally, since the protocol conversion apparatus 1 should be connected only when the charging protocol of the power conditioner is different from a charging protocol of the electric vehicle, any operation for a user to select a charging protocol to be used is not required and a user's operation can be simplified.

While an example in which the power conditioner 2 supports the CHAdeMO scheme has been described in the present embodiment, the protocol conversion apparatus 1 can also be applied to a reverse case, that is, a case where the power conditioner 2 supports the COMBO scheme. When the power conditioner 2 supports the COMBO scheme and the electric vehicle 3 supports the CHAdeMO scheme, the protocol conversion apparatus 1 may be configured to convert a communication signal in the COMBO scheme received from the power conditioner 2 into a communication signal in the CHAdeMO scheme. In other words, the protocol conversion apparatus 1 may be configured such that the first communication unit 12 communicates with the power conditioner 2 using the COMBO protocol, and the second communication unit 13 communicates with the electric vehicle 3 using the CHAdeMO protocol.

Second Embodiment

Figure 7:
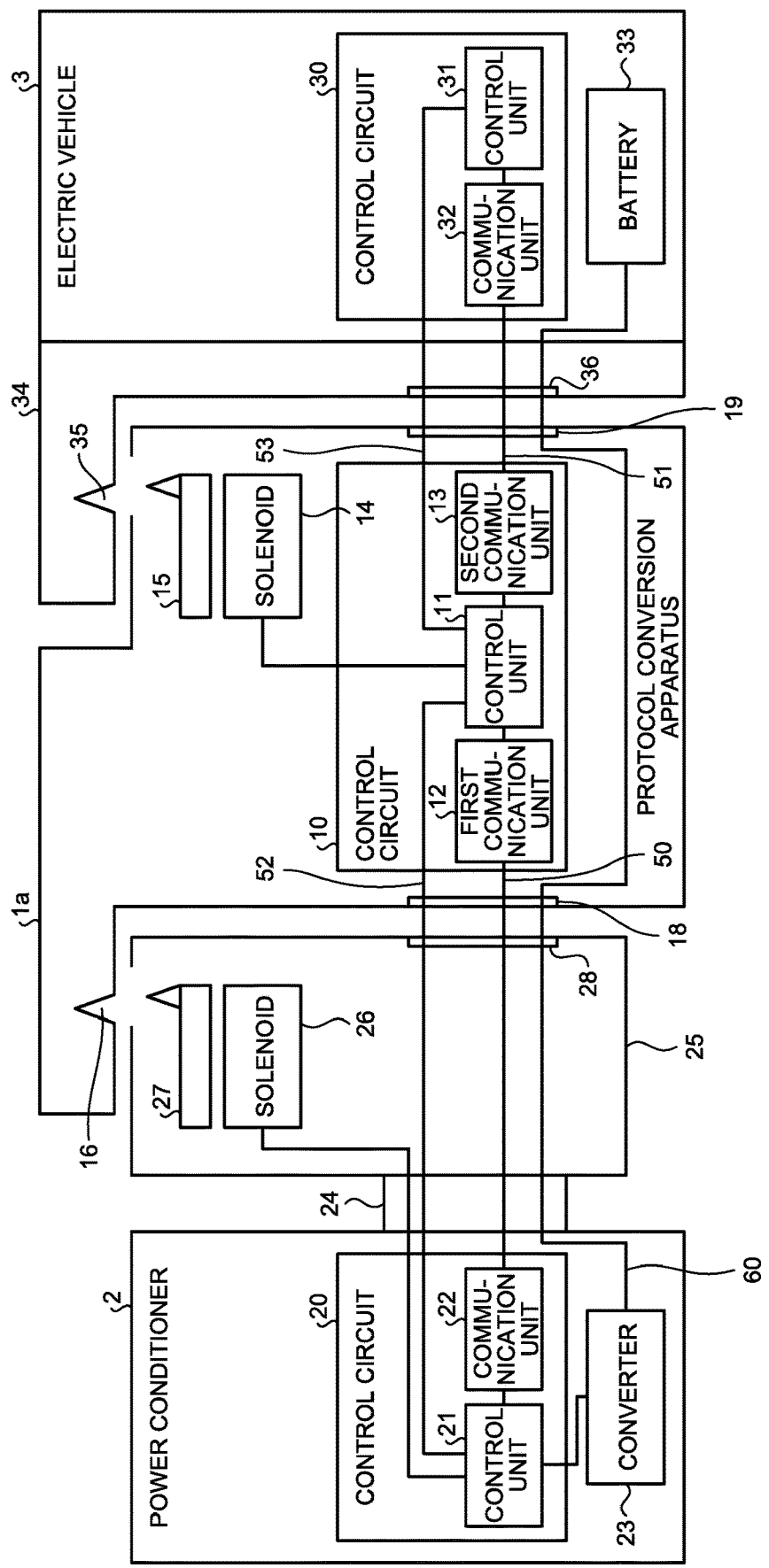
FIG. 7 is a diagram illustrating an exemplary inner configuration of an electric-vehicle charging system according to a second embodiment.

FIG. 7 is a diagram illustrating an exemplary inner configuration of an electric-vehicle charging system according to a second embodiment. In the electric-vehicle charging system according to the second embodiment, the protocol conversion apparatus 1 described in the first embodiment is replaced with a protocol conversion apparatus 1a. A difference from the first embodiment is described in the present embodiment below.

The protocol conversion apparatus 1a according to the second embodiment has a configuration obtained by deleting the switch 17 from the protocol conversion apparatus 1 according to the first embodiment.

Figure 8:
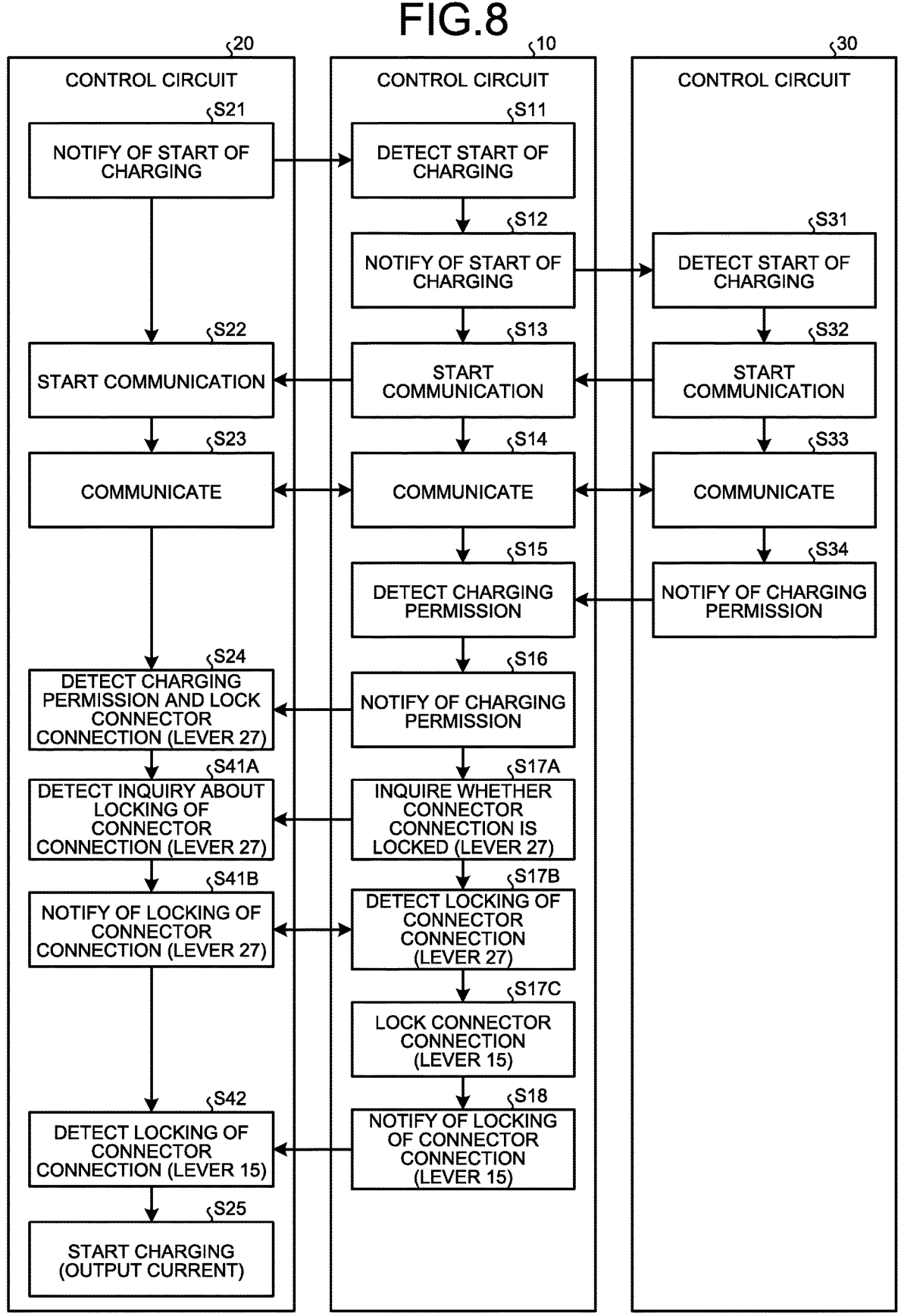
FIG. 8 is a diagram illustrating one example of a charging sequence in the electric-vehicle charging system according to the second embodiment.

FIG. 8 is a diagram illustrating an exemplary charging sequence in the electric-vehicle charging system to which the protocol conversion apparatus according to the second embodiment is applied. FIG. 8 illustrates a sequence in which the control circuit 10 in the protocol conversion apparatus 1a relays communication performed by the control circuit 20 in the power conditioner 2 and the control circuit 30 in the electric vehicle 3 before start of charging the battery 33 in the electric vehicle 3. The charging sequence illustrated in FIG. 8 is obtained by replacing the step S17 in the charging sequence described in the first embodiment, that is, the charging sequence illustrated in FIG. 6, with steps S17A to S17C, and replacing the step S41 with steps S41A to S41B. A difference from the charging sequence illustrated in FIG. 6 is described in the present embodiment below.

The control circuit 10 in the protocol conversion apparatus 1a according to the second embodiment, after having notified the control circuit 20 in the power conditioner 2 of the charging permission in the step S16, inquires of the control circuit 20 about whether locking of the connector connection has been completed, that is, whether inserting the lever 27 into the cutout portion 16 has been completed (step S17A). The control circuit 20 in the power conditioner 2, when receiving the inquiry about whether locking of the connector connection has been completed (step S41A), notifies the control circuit 10 of completing of the locking of the connector connection immediately if the locking of the connector connection has been completed or after locking is completed if the locking of the connector connection has not been completed (step S41B). The control circuit 10, when detecting the completion of the locking of the connector connection on the basis of the notification received from the control circuit 20 (step S17B), enables a current to pass through the solenoid 14 to move the lever 15 so that the lever 15 is inserted into the cutout portion 35 of the charging/discharging cable receptacle 34, thereby locking the connection between the protocol conversion apparatus 1 and the charging/discharging cable receptacle 34 (step S17C).

As described above, the control circuit 10 according to the present embodiment has also a function as a locking-state detection unit that detects the state in which the connection between the protocol conversion apparatus 1a and the power conditioner 2 has been locked.

As described above, the control circuit 10 in the protocol conversion apparatus 1a according to the second embodiment is configured to inquire of the control circuit 20 in the power conditioner 2 about whether or not locking of the connection with the power conditioner 2 has been completed. In this manner, the protocol conversion apparatus 1a eliminates the switch 17 included in the protocol conversion apparatus 1 according to the first embodiment for detecting completing of locking the connection with the power conditioner 2, thus achieving a cost reduction.

Figure 9:
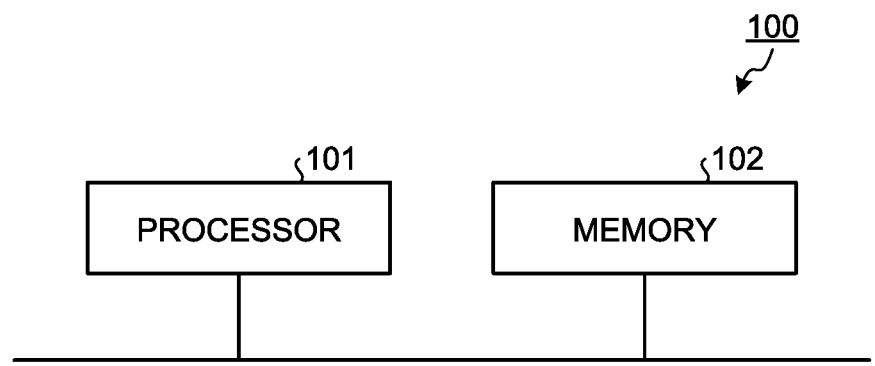
FIG. 9 is a diagram illustrating an exemplary hardware configuration for realizing a control unit.

The control unit 11 constituting the control circuit 10 in the protocol conversion apparatuses 1 and 1a, the control unit 21 constituting the control circuit 20 in the power conditioner 2, and the control unit 31 constituting the control circuit 30 in the electric vehicle 3 as described in the first and the second embodiments can be each implemented by using a processing circuit 100 illustrated in FIG. 9. The processing circuit 100 is configured to include a processor 101 and a memory 102. The processor 101 may be a central processing unit (CPU, also referred to as central processing device, processing unit, arithmetic unit, microprocessor, microcomputer, processor, or DSP), a system large scale integration (LSI), or the like. The memory 102 may be a nonvolatile or volatile semiconductor memory such as a RAM, a ROM, a flash memory, an erasable programmable read only memory (EPROM), an electrically erasable programmable read-only memory (EEPROM), or a magnetic disk, a flexible disk, an optical disk, a compact disk, a mini disk, a digital versatile disc (DVD), or the like. The control units 11, 21, and 31 are each implemented by the processor 101 reading a program for operating as the corresponding control unit from the memory 102.

Each embodiment has been described regarding the protocol conversion apparatus that converts protocols between the electric vehicle 3 and the power conditioner 2 that can charge the battery 33 mounted in the electric vehicle 3 and also can cause the battery 33 to discharge to supply the electricity to a load in a house (not illustrated) or the like. However, the protocol conversion apparatus may be configured to convert protocols between the electric vehicle 3 and a charging apparatus that only charges the battery 33 mounted in the electric vehicle 3. In other words, the protocol conversion apparatuses 1 and 1a according to the present invention can be each applied to an electric-vehicle charging system having a configuration obtained by replacing the power conditioner 2 with a charging apparatus that only charges the battery 33 in the electric vehicle 3.

The configurations in the embodiments described above illustrate some examples of the present invention, and they can be combined with other publicly known techniques and partially omitted or modified without departing from the spirit of the present invention.

REFERENCE SIGNS LIST

1, 1a protocol conversion apparatus; 2 power conditioner; 3 electric vehicle; 10, 20, 30 control circuit; 11, 21, 31 control unit; 12 first communication unit; 13 second communication unit; 14, 26 solenoid; 15, 27 lever; 17 switch; 18, 19, 28, 36 connection unit; 22, 32 communication unit; 23 converter; 24 charging/discharging cable; 25 charging/discharging cable connector; 33 battery; 34 charging/discharging cable receptacle; 29-1, 50, 51 communication line; 29-2, 52, 53 control line; 60 electric-power supply line.

The invention claimed is:

1. A protocol conversion apparatus comprising:
   a first communication integrated circuit (IC) to communicate with a charging apparatus that supports a first charging protocol;
   a second communication IC to communicate with an electric vehicle that supports a second charging protocol;
   a controller provided between the first communication unit and the second communication unit, to
      when receiving from the first communication IC a communication signal received from the charging apparatus, convert the received signal to a communication signal that conforms to the second charging protocol to output the resultant signal to the second communication IC,
      when receiving from the second communication IC a communication signal received from the electric vehicle, convert the received signal to a communication signal that conforms to the first charging protocol to output the resultant signal to the first communication IC, and
      detect a state of connection between the protocol conversion apparatus and the charging apparatus being locked after the charging apparatus and the electric vehicle start communicating with each other; and
   a lever configured to lock connection between the protocol conversion apparatus and the electric vehicle when the locked state of connection is detected.

2. The protocol conversion apparatus according to claim 1, further comprising a switch whose open/closed state represents an operation of a second lever for securing connection, the second lever being equipped in the charging apparatus, the controller detecting the state of the connection between the protocol conversion apparatus and the charging apparatus being locked based on the open/closed state of the switch.

3. The protocol conversion apparatus according to claim 1, wherein the controller detects the state of the connection between the protocol conversion apparatus and the charging apparatus being locked on the basis of a communication signal received by the first communication IC from the charging apparatus.

4. The protocol conversion apparatus according to claim 1, further comprising:
   a solenoid to move, when the state of the connection between the protocol conversion apparatus and the charging apparatus being locked has been detected by the controller, the lever to secure the connection with the electric vehicle.

5. The protocol conversion apparatus according to claim 2, further comprising:
   a solenoid to move, when the state of the connection between the protocol conversion apparatus and the charging apparatus being locked has been detected by the controller, the lever to secure the connection with the electric vehicle.

6. The protocol conversion apparatus according to claim 3, further comprising:
   a solenoid to move, when the state of the connection between the protocol conversion apparatus and the charging apparatus being locked has been detected by the controller, the lever to secure the connection with the electric vehicle.

* * * * *